(12) United States Patent
Moncavage (10) Patent No.: US 7,942,394 B2
(45) Date of Patent: May 17, 2011

(54) LOCKING SUPPORT FIXTURE

(75) Inventor: Charles Moncavage, Nazareth, PA (US)

(73) Assignee: DEK International GmbH, Zurich (CH)

( * ) Notice: Subject to any disclaimer, the term of this patent is extended or adjusted under 35 U.S.C. 154(b) by 122 days.

(21) Appl. No.: 11/031,761

(22) Filed: Jan. 7, 2005

(65) Prior Publication Data

US 2006/0151930 A1    Jul. 13, 2006

(51) Int. Cl.
  *B25B 5/16*    (2006.01)
(52) U.S. Cl. .......................................... 269/266; 269/21
(58) Field of Classification Search ................... 269/266, 269/309, 310, 20, 21, 296; 91/422, 443; 188/67, 129
See application file for complete search history.

(56) References Cited

U.S. PATENT DOCUMENTS

| | | | |
|---|---|---|---|
| 1,453,176 A | | 4/1923 | Perrine |
| 2,754,708 A | | 7/1956 | Peterson |
| 2,882,771 A | | 4/1959 | Blazek |
| 3,589,226 A | | 6/1971 | Shadowens, Jr. |
| 4,088,312 A | * | 5/1978 | Frosch et al. .................... 269/21 |
| 4,200,272 A | * | 4/1980 | Godding ........................ 269/26 |
| 4,206,910 A | | 6/1980 | Biesemeyer |
| 4,572,564 A | | 2/1986 | Cipolla |
| 4,684,113 A | * | 8/1987 | Douglas et al. ................. 269/21 |
| 4,770,455 A | | 9/1988 | Collins, Jr. |
| 4,838,531 A | | 6/1989 | Corsi |
| 4,936,560 A | | 6/1990 | Barozzi |
| 5,120,033 A | | 6/1992 | Shoda |
| 5,152,707 A | | 10/1992 | Dougherty et al. |
| 5,218,753 A | | 6/1993 | Suzuki et al. |
| 5,364,083 A | | 11/1994 | Ross et al. |
| 5,546,784 A | * | 8/1996 | Haas et al. ........................ 72/413 |
| 5,551,677 A | * | 9/1996 | Puettmer et al. ............... 269/266 |
| 5,722,646 A | | 3/1998 | Soderberg et al. |
| 5,738,345 A | | 4/1998 | Schroeder et al. |
| 5,785,473 A | | 7/1998 | Stark |
| 5,788,310 A | | 8/1998 | McKee |
| 5,820,117 A | | 10/1998 | Thompson, Sr. et al. |
| 5,899,446 A | | 5/1999 | Thompson |
| 5,906,364 A | | 5/1999 | Thompson et al. |
| 5,915,679 A | * | 6/1999 | Kohlert .......................... 269/309 |
| 5,984,293 A | | 11/1999 | Abrahamson et al. |
| 6,069,322 A | | 5/2000 | Thompson |

(Continued)

FOREIGN PATENT DOCUMENTS

EP    0899061    6/1998

(Continued)

OTHER PUBLICATIONS

International Search Report mailed Oct. 2, 2003.

(Continued)

*Primary Examiner* — Lee D Wilson
(74) *Attorney, Agent, or Firm* — Renner, Otto, Boisselle & Sklar, LLP (57) ABSTRACT

A pin locking apparatus (1) includes a housing, at least one pin (40) and at least one locking piston (11). The housing includes at least one locking bore (12) and at least one pin bore (14). The at least one pin is slidably contained within the pin bore and is positioned by application of pressure in the pin bore. The at least one locking piston is slidably contained within the locking bore and is actuated by pressure in the locking bore to apply a locking force on the pin.

24 Claims, 7 Drawing Sheets

U.S. PATENT DOCUMENTS

| | | |
|---|---|---|
| 6,199,464 B1 | 3/2001 | Chua et al. |
| 6,202,999 B1 | 3/2001 | Wayman et al. |
| 6,206,054 B1 | 3/2001 | Pengkuson et al. |
| 6,220,806 B1 | 4/2001 | Chapman et al. |
| 6,226,436 B1 | 5/2001 | Daoud et al. |
| 6,726,195 B1 * | 4/2004 | Hertz et al. .................. 269/266 |
| 2006/0151930 A1 * | 7/2006 | Moncavage .................. 269/266 |

FOREIGN PATENT DOCUMENTS

WO          02/36308          5/2002

OTHER PUBLICATIONS

Written Opinion mailed May 20, 2004.
Preliminary Examination Report mailed Oct. 15, 2004.

* cited by examiner

LOCKING SUPPORT FIXTURE

This application claims the benefit of PCT application no. PCT/US03/021222, filed Jul. 7, 2003, which is a continuation in part of PCT application no. PCT/US02/38203, filed Nov. 26, 2002, which claims priority from U.S. Provisional Application Ser. No. 60/394,536, filed Jul. 8, 2002.

FIELD OF THE INVENTION

The present invention relates generally to support fixtures and more specifically to compliant locking support fixtures.

DESCRIPTION OF THE RELATED ART

Support fixtures for propping up workpieces have been widely used in the production of contoured parts from such varying applications as aircraft manufacturing, medical operations and circuit board manufacturing. Regardless of the workpiece, it is important to be able to hold the piece so that machining or further treatment operations can be performed. Generally, support fixtures for holding articles comprise a device containing vertically disposed adjustable pins or rods and means for securing the pins at a given vertical location. Exemplary support fixtures are described in U.S. Pat. Nos. 4,200,272 to Godding, 4,684,113 to Douglas et al., 5,722,646 to Soderberg et al., and 5,984,293 to Abrahamson et al.

U.S. Pat. No. 4,200,272 to Godding discloses a work holder comprising a flat horizontal table in which is mounted a two-dimensional array of vertically disposed spaced-apart rods which protrude upwards through the surface. The rods can be moved upwards individually, either manually or by springs or by fluid pressure means such as rams, and then clamped in position so that their tips form a cradle conforming to the shape of the workpiece, in which the workpiece rests.

U.S. Pat. No. 4,684,113 to Douglas et al. discloses a holding fixture which has a contoured holding surface. The fixture includes a plurality of workpiece engaging rods which are individually adjustable in height. A holding force is generated through the rods to hold the workpiece to the fixture.

U.S. Pat. No. 5,722,646 to Soderberg et al. discloses a tooling system having a support table with multiple openings adapted to removably accept a self-contained actuator. Each opening of the support table provides vacuum and air supply lines as well as a bus interface so that each position may be uniquely addressed and commanded separately from any other openings. The self-contained actuator has corresponding connectors for receiving the vacuum and air supply as well as for interfacing with the bus. An actuator may be placed at a particular location by insertion into the receptacle at the opening in the support table aperture. The actuator may be commanded to raise, lower, lock in position and supply vacuum separate from any other actuator.

U.S. Pat. No. 5,984,293 to Abrahamson et al. discloses a fixture for holding printed circuit board assemblies during stencil printing, pick-and-place processing, and other PCB assembly processes. The fixture has a base and a plurality of support members movably attached to the base. The support members may project away from the base along support paths, and the support members are selectively positionable along the support paths when the support members engage a side of a printed circuit board assembly. The support members may be selectively positioned at heights corresponding to a topography of the side of the printed circuit board assembly to uniformly support the printed circuit board assembly.

Some problems with the prior art support fixtures include substantial set-up time, the requirement of expensive or sophisticated controls, and the inability to perform tasks on objects not accessible by manual means such as when in a hazardous or sterile environment. Another significant problem with the above described support fixture is the requirement for operator intervention to set or reset the pins to conform to each new workpiece. A support fixture is desired which is inexpensive and simple to employ and significantly reduces or eliminates set-up time and operator intervention.

SUMMARY OF THE INVENTION

According to one embodiment, a pin locking apparatus for use in a support fixture includes a housing, at least one pin and at least one locking piston. The housing includes at least one locking bore and at least one pin bore. The at least one pin is slidably contained within the pin bore and is positioned by application of pressure in the pin bore. The at least one locking piston is slidably contained within the locking bore and is actuated by pressure in the locking bore to apply a locking force on the pin.

Another aspect is a method of positioning and locking a pin. The steps include applying a first fluid pressure to raise a pin to a desired position and applying a second fluid pressure to move a locking piston so that it engages and locks the pin at the desired location.

A further aspect is a method of operating a pin locking apparatus for manufacturing workpieces which comprises locking the pins of a pin locking apparatus to secure a first workpiece, unlocking the pins of the pin locking apparatus, and automatically relocking the pins of the pin locking apparatus to secure a second workpiece.

According to another embodiment, a system for setting and resetting pins for use in manufacturing a workpiece comprises a pin locking apparatus having a plurality of pins; and a host machine that provides a signal to the pin locking apparatus to facilitate the automatic setting and resetting of the pins of the pin locking apparatus.

According to another embodiment, a system for setting and resetting pins for use in manufacturing a workpiece comprises a pin locking apparatus having a plurality of pins, and a controller which is capable of automatically setting and resetting the pins of the pin locking apparatus.

DETAILED DESCRIPTION OF THE PREFERRED EMBODIMENT

This application hereby incorporates by reference the entire disclosure in U.S. provisional application Ser. No.

60/394,536, filed Jul. 8, 2002, and PCT Application Serial No. PCT/US02/38203, filed Nov. 26, 2002.

This description of embodiments is intended to be read in connection with the accompanying drawing(s), which are to be considered part of the entire written description of this invention. In the description, relative terms such as "horizontal," "vertical," "up," "down," "top", "bottom", "front", "back", "forward", and "rearward", as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation.

Figure 1:
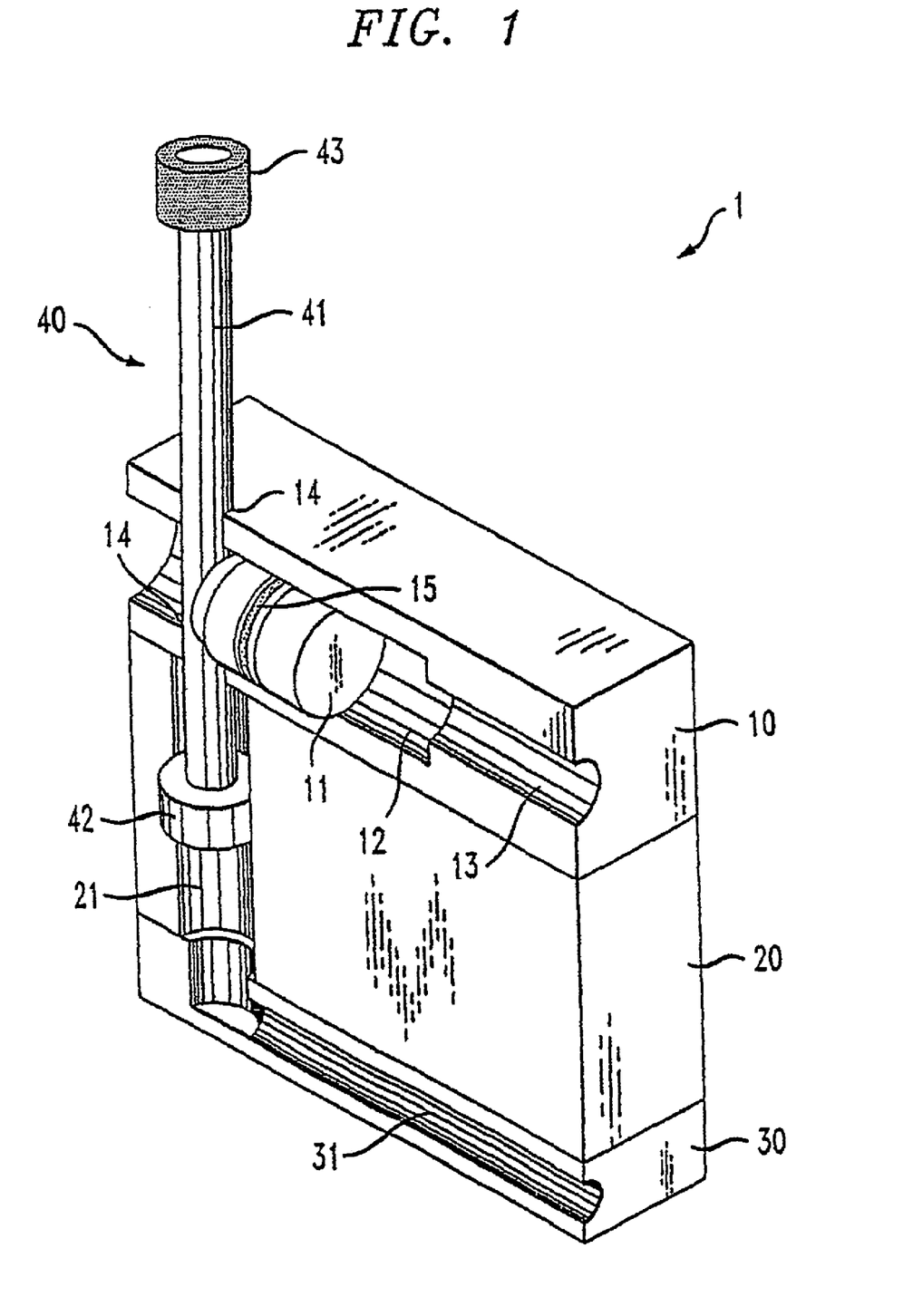
FIG. 1 is a cross-sectional view of a pin locking apparatus according to one embodiment.

FIG. 1 shows a portion of an exemplary pin locking apparatus 1. Pin locking apparatus 1 has a housing 100, pin 40 and locking piston 11. Housing 100 includes lock plate 10, cylinder block 20, and base plate 30. Although shown as separate pieces assembled together, two or more of the preceding elements may be formed from a single piece of material. Lock plate 10 includes locking piston 11a locking bore 12, a pin locking channel 13, and a pin opening 14. Preferably, locking bore 12 is a horizontally bored hole, which movably retains the locking piston 11. Preferably, locking piston 11 includes an o-ring 15. The pin locking channel 13 is preferably also a horizontally bored hole, which is fluidly connected to the locking bore 12 and preferably has a smaller diameter than the locking bore. (As an alternative to having a separate reduced-diameter pin locking channel, the pin locking apparatus may have an extended constant-diameter locking bore 12 which can additionally perform the functions of the pin locking channel (i.e., fluidly connecting one side of the locking bore 12 to a source of pressurized fluid or vacuum). Where a locking bore 12 with only a single diameter is employed, preferably the pin locking apparatus has a means for restricting movement of the locking piston, such as a stop adjacent to the locking bore or projecting from a side wall of the locking bore.) The pin locking channel 13 is fluidly connected to a pneumatic device for delivery of fluid pressure (preferably air pressure) or vacuum to allow the locking piston 11 to engage or disengage a shaft 41. The pin opening 14 is sized to guide a shaft 41 of the pin 40 as it is extended and retracted in the pin locking apparatus 1. Pin opening 14 should be smaller in diameter than a piston 42 of the pin 40 to ensure that the pin 40 is retained within the pin locking apparatus 1 when pressure is applied to raise the pins 40. Preferably, lock plate 10 is formed of aluminum, but may be made of any suitable material.

Cylinder block 20 includes a pin bore 21. Pin bore 21 is a vertically bored hole for slidably engaging a piston 42 of the pin 40. Pin bore 21 is fluidly connected to a pin adjustment channel 31 of base plate 30. The diameter of the pin bore 21 corresponds to the diameter of piston 42 and is preferably sized so that some amount of air may pass by the piston 42. Preferably, cylinder block 20 is made of aluminum, but may be made of any suitable material.

Base plate 30 includes a pin adjustment channel 31 for delivering air pressure and vacuum to the pin bore 21 of the cylinder block 20. Preferably, pin adjustment channel 31 is a horizontally bored hole. The pin adjustment channel 31 is fluidly connected to a pneumatic device 60 (see FIG. 3) for delivery of air pressure or vacuum to extend or retract a shaft 41. (Alternatively, or in addition to the use of air pressure to extend the shaft, the shaft may be extended by spring force.) Preferably, base plate 30 is made of aluminum, but may be made of any suitable material.

Pin 40 includes a shaft 41 and a piston 42. Shaft 41 is slidably received in pin opening 14. Preferably, shaft 41 includes a cap 43 made of a soft, resilient or deformable material, such as plastic or a complaint rubber material, for supporting an object, especially in applications where there is a chance of marking or otherwise damaging a workpiece. Pin 40 may consist of one piece with a different diameter for shaft 41 and piston 42, or two separate pieces that are mated together. Pin 40 is preferably made from a hard material such as steel so that it is not damaged by the locking piston 50 being wedged against it. The material should also preferably be rigid so that it provides adequate support to a workpiece 50.

Figure 2A:
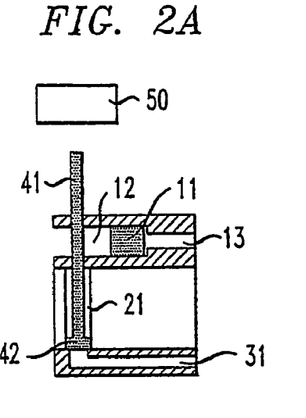
FIGS. 2A-2E are schematic cross-sectional views of a pin locking apparatus depicting the steps locking and unlocking pins.
Figure 2B:
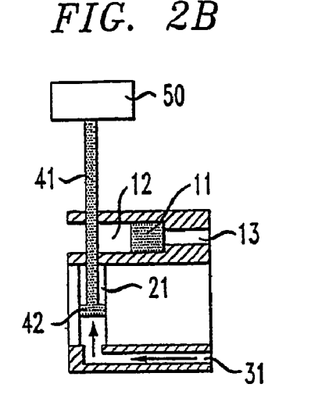

Referring to FIGS. 2A-2E, the steps of positioning a shaft 41 to a desired location to support a workpiece and resetting the shaft 41 are illustrated. FIG. 2A shows the pin locking apparatus 1 in an unlocked (or reset) position. FIG. 2B illustrates the step of applying air pressure via the pin adjustment channel 31 to extend the pin 40 until the shaft 41 engages a workpiece 50 upon which a task is to be performed. (As stated above, the pin may also be extended by spring force.) Preferably air pressure is applied using a pneumatic device 60, such as an air compressor. The pressure is preferably just enough to raise the pin 40 lightly until the shaft 41 contacts the surface of the workpiece to be supported.

Figure 2C:
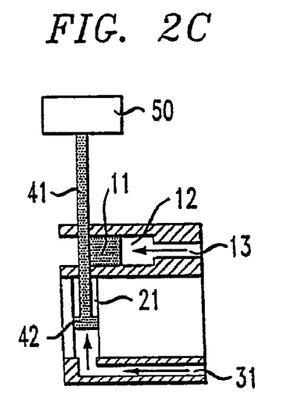

FIG. 2C illustrates the step of applying air pressure via the pin locking channel 13 to move a locking piston 11 so that it engages and locks the shaft 41 of a pin 40 at the desired location. Air pressure continues to be applied via the pin adjustment channel 13 at least until the shaft 41 is locked by engagement by the locking piston 11. Preferably air pressure applied to the move the locking piston 11 is also applied using a pneumatic device 60, such as an air compressor. A single pneumatic device may supply air pressure to both air channels 13, 31 or separate pneumatic devices may be employed.

Figure 2D:
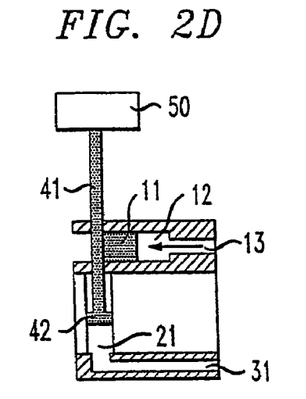

FIG. 2D illustrates the step of removing the air pressure applied to raise the pin 40. The shaft 41 remains locked at the desired position by the frictional engagement of the locking piston 11. Preferably, the air pressure applied via the pin locking channel 13 is maintained until the task being performed on the workpiece is completed. For supporting light or delicate objects, where less force is required, the frictional force can be regulated by adjusting the air pressure being applied to the locking piston 11.

Figure 2E:
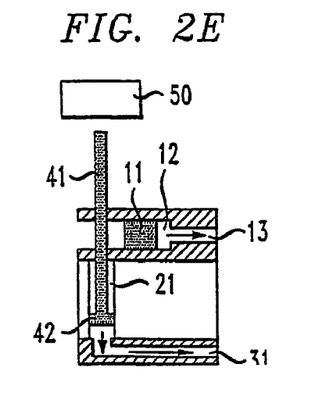

FIG. 2E illustrates the step of disengaging the locking piston 11 from the shaft 41 to reset the pin locking apparatus 1 for a different operation. To disengage the shaft 41, vacuum is applied via the pin locking channel 13 to move the locking piston 11 in the locking bore 12 away from shaft 41. Preferably vacuum is applied using a pneumatic device 60, such as a vacuum pump. A single pneumatic device may supply both vacuum and air pressure to the air channels 13, 31, or separate pneumatic devices may be employed. Preferably, while vacuum is applied to the pin locking channel 13, vacuum is also being applied to the pin adjustment channel 31 to aid in retracting the pin 40 from its heightened position. However, in certain circumstances, vacuum to the pin adjustment channel 31 may not be necessary, since gravity may act to retract the pin 40. Once the locking piston 11 has been disengaged and the shaft 41 has been retracted, the vacuum may be removed from the air channels 13, 31. The pin locking apparatus 1 is then reset and ready for use with a different workpiece.

As stated above, one or more pneumatic devices 60 may be employed to supply air pressure and vacuum to the pin locking apparatus 1. In one preferred embodiment, the pneumatic device 60, and therefore the setting and resetting (or locking and unlocking) of the pin locking apparatus 1, is controlled by a controller 80 (See FIG. 3), such as a computer, which automatically and sequentially controls the device. The controller 80 preferably contains the logic and switching devices which orchestrates the sequence of operations of any employed pin locking apparatus 1, 3, 4, 5, 96. The pneumatic device 60 may also be controlled manually.

Figure 3:
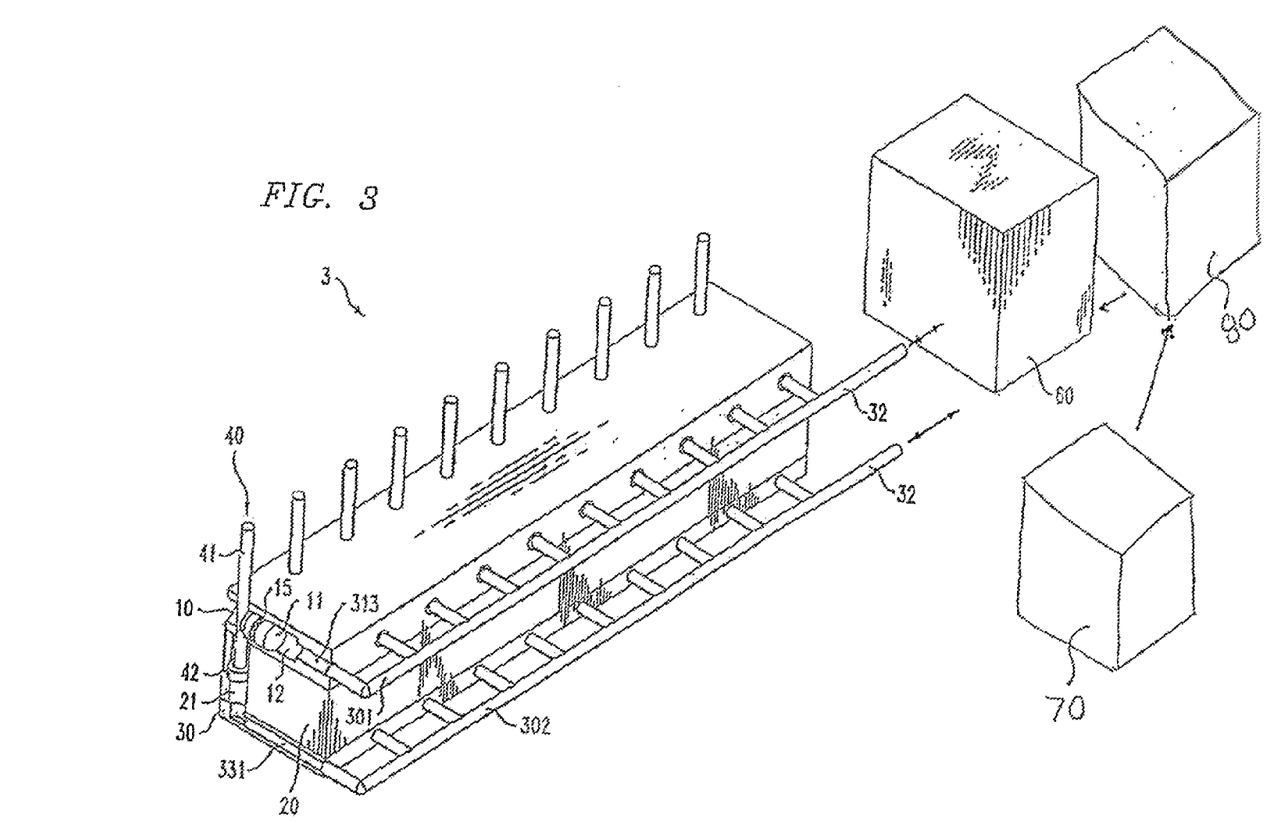
FIG. 3 is a partial cross-sectional view of a pin locking apparatus according to a second embodiment.

Referring to FIG. 3, a pin locking system 90 is shown, wherein the pin locking apparatus 3 (or the pneumatic device 60 that operates the pin locking apparatus) may be triggered to set or reset the pins by one or more host machine devices 70 that are involved in the assembly of the workpiece being manufactured. For example, where circuit boards are being manufactured, for example, the pin locking apparatus 3 or pneumatic device 60 may be triggered to set, unlock and/or reset the pins by devices such as a solder paste printer, a pick and place machine, a C & C milling machine, a board clamp device, and/or a drill press, or any other machine or assembly device performing an operation on the workpiece. One or more of these devices provide a signal to the pin locking apparatus 3, either directly or through the pneumatic device 60 or controller 80, for example, to trigger the setting, unlocking and/or resetting of the pins. The employment of the host machine device 70 may advantageously allow the system 90 to automatically reset for each workpiece without any need for operator intervention.

Figure 8:
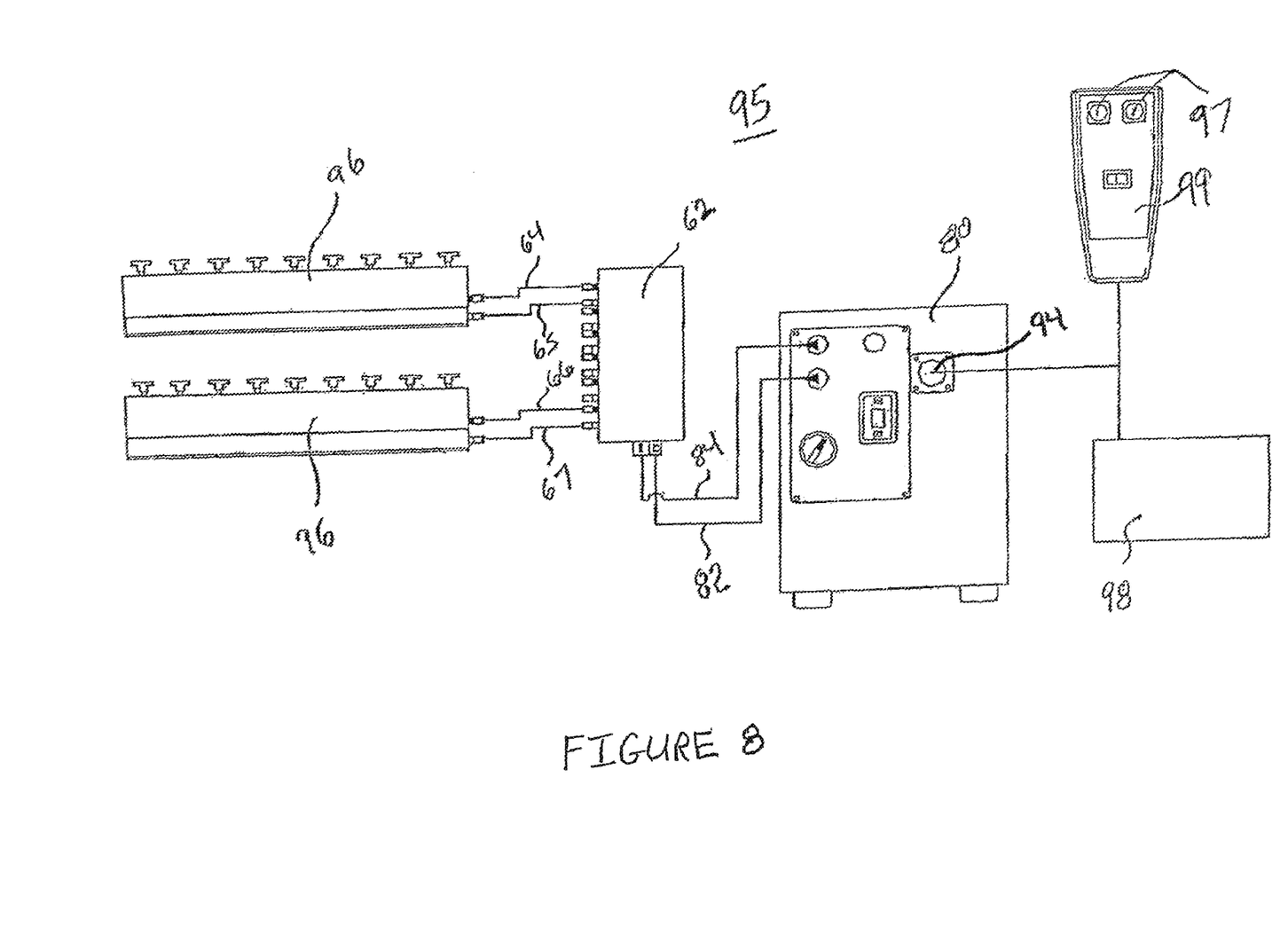
FIG. 8 is a schematic of pin locking system according to an exemplary embodiment.

Referring to FIG. 8, a schematic of an embodiment of a pin locking system 95 is shown, including at least one pin locking apparatus 96, a distribution manifold 62, a controller 80, and a sensing mechanism 98. The pin locking system also preferably includes a pneumatic device (not shown) which is connected to the controller 80, or, alternatively, is integral with the controller 80. Preferably, the controller 80 includes two lines 82, 84 for controlling the air pressure and vacuum to the pin locking apparatuses 96, which are preferably connected to the distribution manifold 62 (or alternatively may be connected directly to the pin locking apparatuses 96). The distribution manifold 62 can divide the air pressure and vacuum from the lines 82, 84 of the controller 80 into a plurality of lines 64, 65, 66, 67 to support a plurality of pin locking apparatuses 96.

Alternatively, or in addition to, the sensing mechanism 98, the pin locking system 95 may include a manual input device 99. The sensing mechanism 98, which triggers the pin locking apparatus 96 to set, unlock, and/or reset the pins, may be, for example, an optical sensing device or a pressure sensor, but may include a variety of other sensing devices. The controller 80 preferably includes a plug 94 or other input means into which the sensing mechanism 98 is connected. The sensing mechanism 98 (such as an optical sensor or pressure sensor) may operate by sensing the presence of a workpiece at the location of the pin locking apparatus 96, thereby signaling the controller 80 to automatically reset (lift and lock) the pins. The sensing mechanism could likewise sense the absence of the workpiece, such as when it has left the pin locking apparatus 96, and thereby signal the controller 80 to unlock and lower the pins to prepare for a subsequent workpiece. The sensing mechanism may advantageously allow the system 95 to automatically reset for each workpiece without any need for operator intervention.

The manual input device 99, which also operates to trigger the pin locking apparatus, may be, for example, a mechanism which has buttons 97 (e.g., "up" and "down" buttons) or switches for allowing an operator to set (lift) or unlock (lower) the pins. The controller 80 preferably includes a plug 94 or other input means into which the manual input device 99 is connected. This use of a manual input device 99 may advantageously allow an operator to choose when to reset the pin locking apparatus 96 as opposed to having it automatically reset to each workpiece.

Figure 4:
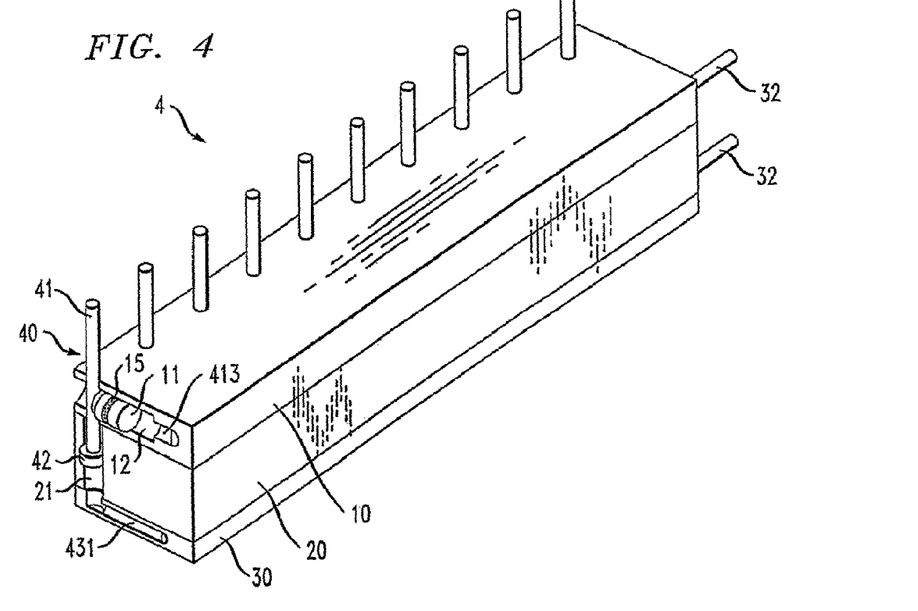
FIG. 4 is a partial cross-sectional view of a pin locking apparatus according to third embodiment.
Figure 5:
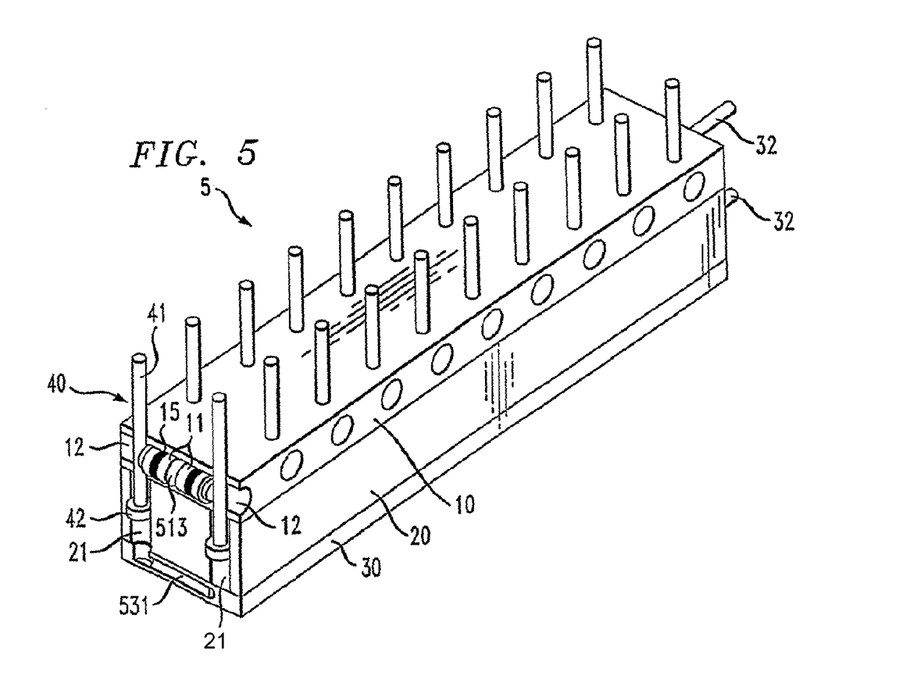
FIG. 5 is cross-sectional view of a pin locking apparatus according to a fourth embodiment.

FIGS. 3-5 show other embodiments of a pin locking apparatus, each including a plurality of pins 40, a plurality of locking pistons 11, and a housing 300, 400, 500 including a plurality of locking bores 12 that movably contain respective locking pistons 11, a plurality of pin bores 21 each capable of movably containing a respective pin 40, a pin locking channel 313, 413, 513 fluidly connected to each locking bore 12, and a pin adjustment channel 331, 431, 531 fluidly connected to each pin bore 21. Preferably the locking pistons 11, locking bores 12 and pin locking channel 313, 413, 513 are contained within a lock plate 10, the pin bores 12 are contained within a cylinder block 20 and the pin adjustment channel 331, 431, 531 is contained within a bottom plate 30. Further, these pin locking apparatuses 3, 4, 5 preferably also include an o-ring 15 on each locking piston 50, and air connection means, such as connection ports 32, for connecting the pin locking channel and pin adjustment channel to a pneumatic device 60. Preferably the pins 40 and corresponding pin bores 21 are arranged in one or more rows. The number of rows and pins, as well as the spacing between pins, can be varied depending on the size and make-up of the workpiece. The pin locking apparatuses 3, 4, 5 may further include one or more pneumatic devices 60 for supplying air pressure or vacuum to such apparatuses. The method of setting and resetting (or locking and unlocking) the pins of these pin locking apparatuses is essentially the same as that described above with respect to the embodiment of FIG. 1.

Referring to FIG. 3, a pin locking apparatus 3 is shown wherein the locking plate 10 of housing 300 has a plurality of pin locking channels 313 and the base plate 30 has a plurality of pin adjustment channels 331. Pin locking apparatus 3 includes a first and second external air conduit 301, 302. The first external air conduit 301 is fluidly connected to each pin locking channel 313. The second external air conduit 302 is fluidly connected to each pin adjustment channel 331. The first and second external air conduits 301, 302 preferably include an air connection means, such as connection ports 32, for connecting the external air conduits to a pneumatic device 60.

Referring to FIG. 4, another embodiment of the invention is shown that is similar to the embodiment of FIG. 3, except that rather than having a portion of the air flow means of the pin locking apparatus 4 plumbed externally, the means of air flow is essentially completely internal. The single pin locking channel 413 is enclosed within the lock plate 10 of housing 400 and branches to fluidly connect to each locking bore 12. Likewise, the single pin adjustment channel 431 is enclosed within the base plate 30 and branches to fluidly connect to each pin bore 21. Preferably, the pin locking apparatus 4 includes an air connection means, such as connection ports 32, for fluidly connecting the air channels 413, 431 to a pneumatic device 60.

Referring to FIG. 5, another embodiment of the invention is shown wherein the pin locking apparatus 5 includes at least two rows of pins 40 with opposing and aligned locking pistons 11. As can be understood from FIG. 5, a single pin locking channel 513 in housing 500 is fluidly connected to the locking bores 12 that movably contain the locking pistons 11, which in turn engage the respective shafts 41 in the two aligned rows of pins 40. Likewise, a single pin adjustment channel 531 is fluidly connected to each pin bore 21 which movably retain the pistons 42 in the two aligned rows of pins 40. Preferably, the pin locking apparatus 5 includes an air connection means, such as connection ports 32, for fluidly connecting the air channels 513, 531 to a pneumatic device 60.

Figure 6:
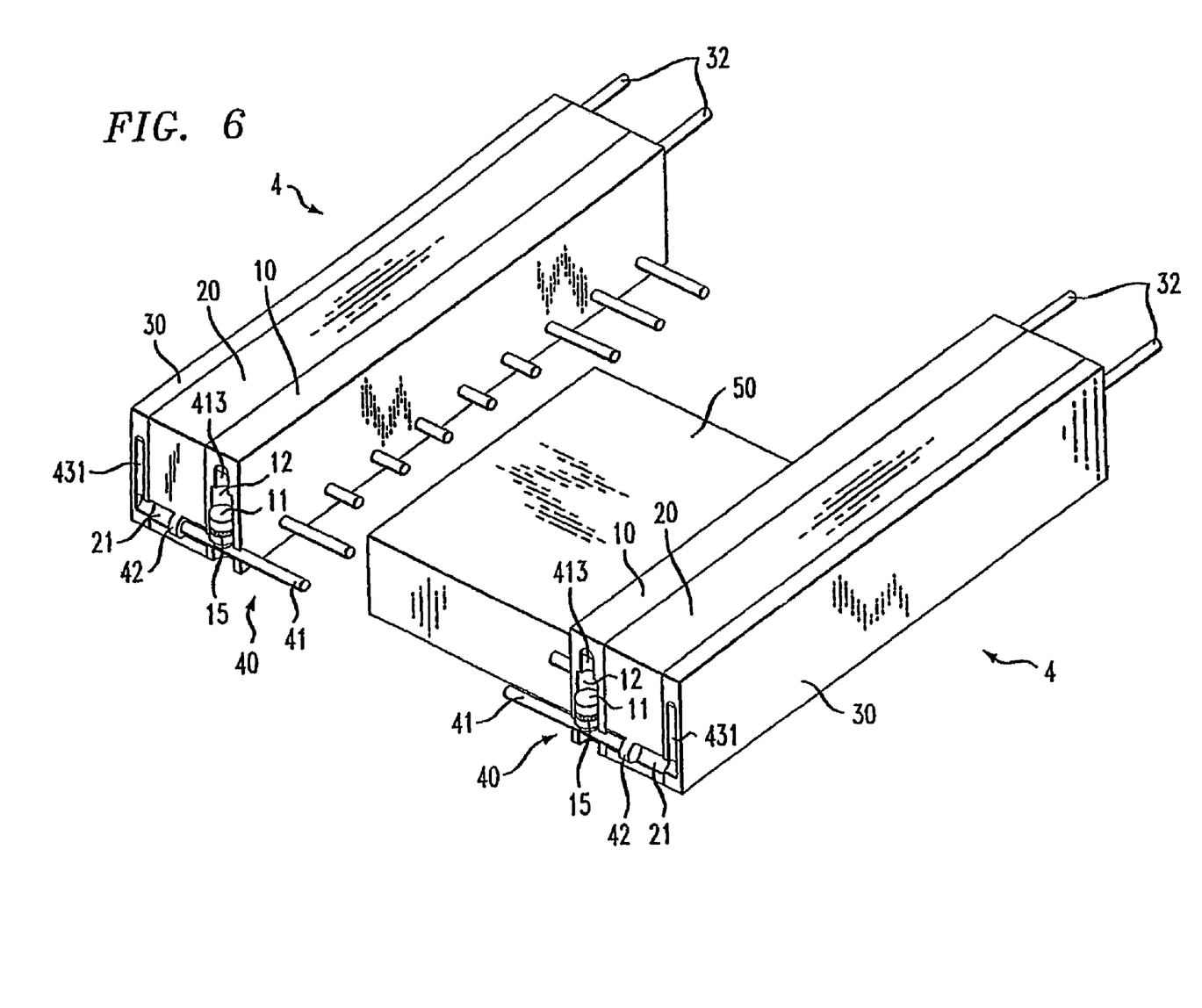
FIG. 6 is a view of two pin locking apparatuses in cross-section shown employed with a workpiece.

FIG. 6 illustrates two pin locking apparatuses 4 employed in conjunction with each other to grip or lift a workpiece 50. Although illustrated using the embodiment shown in FIG. 4, the embodiments of FIG. 3 or 5 may be used, as well as other embodiments using two or more rows of pins.

Figure 7:
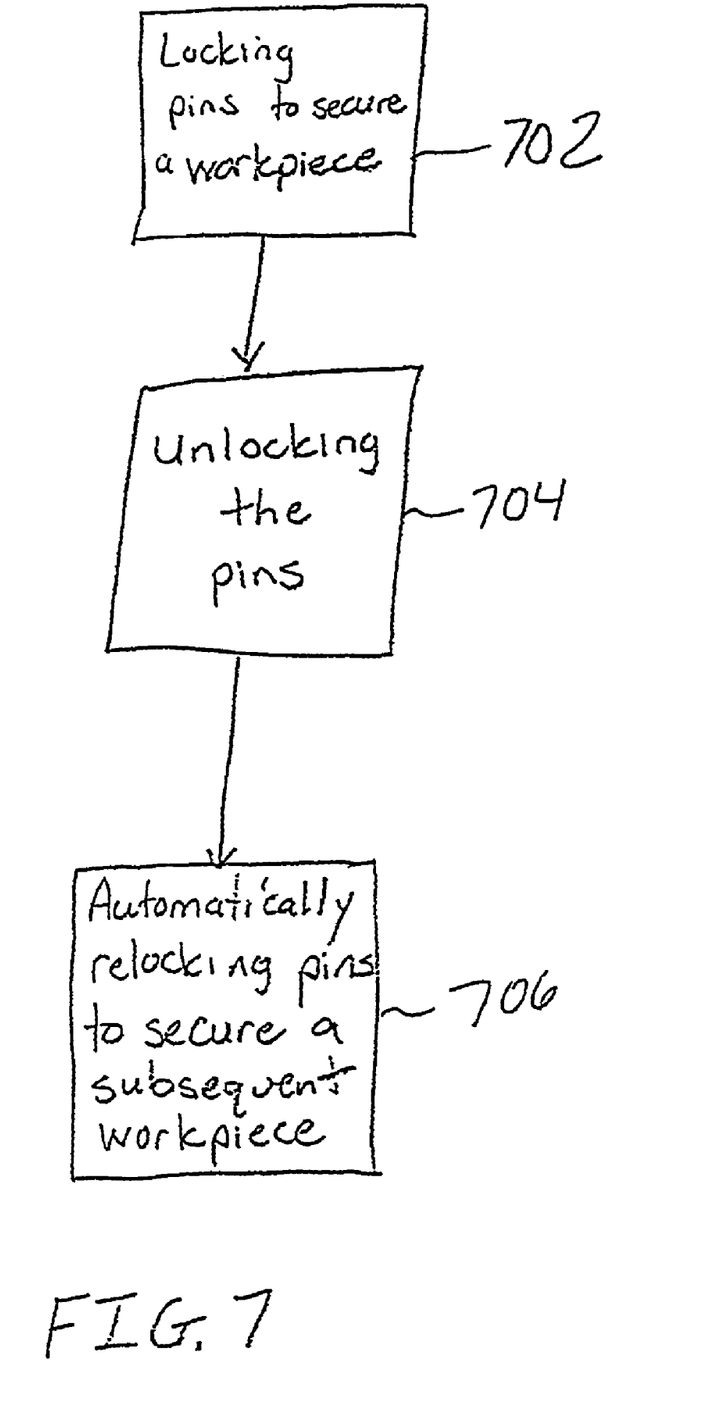
FIG. 7 is a flow chart diagram showing the process steps according to one exemplary embodiment.

Referring to FIG. 7, a method of operating a pin locking apparatus for manufacturing workpieces according to one embodiment includes locking (or setting) 702 the pins of a pin locking apparatus to secure a first workpiece, unlocking 704 the pins of the pin locking apparatus, and automatically relocking (or resetting) 706 the pins of the pin locking apparatus to secure a second or subsequent workpiece. Preferably, the initial locking or setting of the pins and the unlocking of the pins are also performed automatically. Preferably these steps occur without any operator intervention. Also preferably, the step of relocking occurs no more than three seconds after the pins are unlocked. However, the step of relocking may occur more than three seconds after the pins are unlocked, but preferably occurs within an amount of time that does not interfere with the normal operation of any machine that is being employed to assemble the workpiece. This automatic relocking ability advantageously allows the pin locking apparatus to quickly reconform to a subsequent workpiece or any number of subsequent workpieces having a structural difference from the previous workpiece that was secured by the pin locking apparatus. This is especially beneficial in the manufacture of circuit boards where slight deviations are often present between individual circuit boards and readjustment of the support fixture is beneficial for maintaining circuit boards of good quality. Current support fixtures either fail to compensate for deviations in subsequent workpieces or require operator intervention between subsequent workpieces to reset the support fixture to conform to each subsequent workpiece.

Although the invention has been described in terms of exemplary embodiments, it is not limited thereto. Rather, the appended claims should be construed broadly, to include other variants and embodiments of the invention which may be made by those skilled in the art without departing from the scope and range of equivalents of the invention. For example, although shown in the figures as including one or two rows of pins per pin locking apparatus, the pin locking apparatus may contain any number of rows, which may contain pins that are aligned or unaligned, and have various spacing or distances between the pins.

What is claimed is:

1. A pin locking apparatus, comprising:
    a housing having at least one pin bore, the at least one pin bore having an inner end and an outer end, at least one pin opening fluidly connected to the outer end of the at least one pin bore and having a smaller size than the at least one pin bore, at least one pin adjustment channel fluidly connected to the inner end of the at least one pin bore, at least one locking bore, and at least one pin locking channel fluidly connected to the at least one locking bore;
    at least one pin comprising a piston and a shaft, the piston being slideably contained within the at least one pin bore and the shaft being slideably received in the respective pin opening to be extendable from the pin opening by application of a pneumatic pressure in the at least one pin adjustment channel; and
    at least one locking piston slidably contained within the at least one locking bore and actuated by a pneumatic pressure in the at least one locking bore to apply a locking force on the at least one pin.

2. The apparatus of claim 1, wherein the at least one pin locking channel is fluidly connected to apply a positive pressure or vacuum to the at least one locking bore.

3. The apparatus of claim 1, wherein the at least one locking piston, the at least one locking bore and the at least one pin locking channel are contained in a locking plate, and the locking plate includes at least one pin opening aligned with the at least one pin bore.

4. The apparatus of claim 3, wherein the at least one pin bore is contained within a cylinder block, and the at least one pin adjustment channel is contained within a bottom plate.

5. The apparatus of claim 4, wherein the locking plate, the cylinder block and the bottom plate are separate pieces that are assembled together.

6. The apparatus of claim 4, wherein the locking plate, the cylinder block and the bottom plate are formed from a single piece of material.

7. The apparatus of claim 1, wherein the at least one pin bore is contained within a cylinder block.

8. The apparatus of claim 1, wherein the at least one pin adjustment channel is contained within a bottom plate.

9. The apparatus of claim 1, wherein the at least one locking piston includes an o-ring seal.

10. The apparatus of claim 1, wherein the at least one pin includes a piston and a shaft, the piston having a greater diameter than the shaft.

11. The apparatus of claim 1, wherein the at least one locking piston has a locking position for locking the at least one pin at a desired height and an unlocking position, and the at least one locking piston engages the at least one pin in the locking position and is remote from the at least one pin in the unlocking position.

12. The pin locking apparatus of claim 1, wherein the housing has a plurality of locking bores that include the at least one locking bore and a plurality of pin bores that include the at least one pin bore, and comprising:
    a plurality of pins slidably contained within respective ones of the pin bores, each pin positioned by application of a pneumatic pressure in the corresponding pin bore; and
    a plurality of locking pistons, each slidably contained within a respective locking bore, each locking piston being actuated by a pneumatic pressure in the corresponding locking bore to apply a locking force on the corresponding pin in that locking bore.

13. The apparatus of claim 12, wherein the at least one pin locking channel is fluidly connected to apply a positive pressure or vacuum to the locking bores.

14. The apparatus of claim 13, further comprising:
    a first external air conduit fluidly connected to each pin locking channel and a second external air conduit fluidly connected to each pin adjustment channel.

15. The apparatus of claim 13, wherein the at least one pin locking channel and the at least one pin adjustment channel are enclosed within the pin locking apparatus.

16. The apparatus of claim 15, wherein the at least one pin locking channel is enclosed within a locking plate, and the at least one pin adjustment channel is enclosed within a base plate.

17. The apparatus of claim 15, wherein the pin locking apparatus includes at least two rows of pins with opposing locking pistons.

18. The apparatus of claim 13, further comprising:
    air connection means for connecting the at least one pin locking channel to a pneumatic device.

19. The apparatus of claim 13, further comprising:
a pneumatic device, wherein the pneumatic device is fluidly connected to one or both of the at least one pin locking channel and the at least one pin adjustment channel.

20. The apparatus of claim 19, wherein the pneumatic device provides one or both of a positive pressure and vacuum to one or both of the at least one pin locking channel and the at least one pin adjustment channel for locking and unlocking the locking pistons.

21. The apparatus of claim 20, wherein the pneumatic device is controlled by a programmable controller.

22. The apparatus of claim 20, wherein the pneumatic device is controlled manually.

23. The apparatus of claim 13, further comprising:
first and second pneumatic devices, the first pneumatic device being fluidly connected to the at least one pin locking channel and the second pneumatic device being fluidly connected to the at least one pin adjustment channel.

24. The apparatus of claim 1, wherein the at least one pin has a shaft and a cap made of a material softer than the shaft.

* * * * *